United States Patent
Yamaguchi

[11] Patent Number: 5,899,286
[45] Date of Patent: May 4, 1999

[54] HYBRID VEHICLE

[75] Inventor: Kozo Yamaguchi, Aichi-ken, Japan

[73] Assignee: Kabushiki Kaisha Equos Research, Japan

[21] Appl. No.: 08/595,546

[22] Filed: Feb. 1, 1996

[30] Foreign Application Priority Data

Feb. 2, 1995 [JP] Japan .................................. 7-037567

[51] Int. Cl.⁶ .............................................. B60K 1/00
[52] U.S. Cl. ........................................ 180/65.3; 180/65.1
[58] Field of Search ................................. 280/65.2, 65.4,
280/65.3, 65.6, 65.7; 475/5; 74/661; 322/11

[56] References Cited

U.S. PATENT DOCUMENTS

| | | | |
|---|---|---|---|
| 3,566,717 | 3/1971 | Berman et al. | 180/65.2 |
| 3,650,345 | 3/1972 | Yardney | 180/65.2 |
| 3,861,484 | 1/1975 | Joslin | 180/65 A |
| 4,042,056 | 8/1977 | Horwinski | 180/65.2 |
| 4,335,429 | 6/1982 | Kawakatsu | 364/424 |
| 4,351,405 | 9/1982 | Fields et al. | 180/65.2 |
| 4,495,451 | 1/1985 | Barnard | 318/150 |
| 4,753,078 | 6/1988 | Gardner, Jr. | 60/668 |
| 5,115,183 | 5/1992 | Kyoukane et al. | 320/61 |
| 5,264,764 | 11/1993 | Kuang | 318/139 |
| 5,343,970 | 9/1994 | Severinsky | 180/65.2 |
| 5,376,869 | 12/1994 | Konrad | 318/587 |
| 5,492,189 | 2/1996 | Kriegler et al. | 180/65.2 |
| 5,495,912 | 3/1996 | Gray, Jr. et al. | 180/165 |
| 5,550,445 | 8/1996 | Nii | 318/153 |
| 5,558,588 | 9/1996 | Schmidt | 475/5 |
| 5,562,565 | 10/1996 | Moroto et al. | 477/3 |
| 5,566,774 | 10/1996 | Yoshida | 180/65.4 |
| 5,608,308 | 3/1997 | Kiuchi et al. | 322/11 |
| 5,614,809 | 3/1997 | Kiuchi et al. | 322/11 |
| 5,643,119 | 7/1997 | Yamaguchi et al. | 475/5 |
| 5,667,029 | 9/1997 | Urban et al. | 180/65.2 |

FOREIGN PATENT DOCUMENTS 4324010  1/1995  Germany .

Primary Examiner—Robert J. Oberleitner
Assistant Examiner—Bridget Avery
Attorney, Agent, or Firm—Lorusso & Loud

[57] ABSTRACT

A hybrid vehicle controls operation of an engine, a generator and a motor to retain driving comfort. The engine and the generator are connected through a planetary gear unit to a drive shaft, and the output of the engine 1 is split between the generator and the drive shaft. An engine control system controls the output of the engine by controlling the degree of throttle opening θ responsive to engine speed. A generator control system controls electric current IG of the generator in order to achieve a target rotational speed NG*. A vehicle control system supplies a motor control system with a torque signal TM* based on the degree of accelerator opening α and vehicle speed V, and computes a value for compensatory torque ΔTM from values for generator rotational speed NG and generator torque TG which are supplied from the generator control system. The motor control system controls electric current IM to the motor in accordance with the values for torque TM* and the compensatory torque ΔTM.

17 Claims, 6 Drawing Sheets

HYBRID VEHICLE

BACKGROUND OF THE INVENTION

1. Field of the Invention

This invention relates to a hybrid vehicle and, more particularly, to a hybrid vehicle selectively driven by a motor and/or an internal-combustion engine.

2. Description of the Related Art

Hybrid vehicles which combine a fuel fed conventional engine and a motor using clean electric energy have been proposed. Three types of hybrid vehicles are known: a series type in which an engine is used for generating electricity to charge a battery, a parallel type in which the engine is connected to the drive train of the vehicle, and a combined type (a seri-para type) which combines features of the series and parallel types.

In particular, a hybrid vehicle has been proposed (U.S. Pat. No. 3,566,717), in which the generator is connected to the engine, and a part of the output from the engine is used for generating electricity while the remaining output from the engine is directly output through a drive shaft to drive wheels, utilizing a planetary gear unit to combine that direct engine output with output of a motor. This hybrid vehicle is capable of restricting operation of the engine to a highly efficient range, thereby improving fuel efficiency, because all the energy produced by the engine is not used for generation of electricity. Furthermore, the hybrid vehicle can be driven with the engine operating at constant conditions, so that undesirable exhaust emissions can be decreased.

However, the hybrid vehicle disclosed in the aforementioned patent has the engine, the generator and the driving motor all mutually connected through the planetary gear unit and, consequently, it has the disadvantage of disruption of driving comfort caused by each torque change, produced by the engine, the generator and the motor. Further, control of the engine, the generator and the motor, must provide that operation of each should be prevented from interfering with that of the others.

SUMMARY OF THE INVENTION

Accordingly, it is an object of the present invention to provide a hybrid vehicle that is capable of simultaneously operating the engine, the generator and the motor without loss of driving comfort, that has the generator connected to the engine, and wherein a part of the output from the engine is used for generating electricity while the remaining output from the engine is directly transmitted through the drive shaft to the drive wheels.

In order to attain the aforementioned objective, the present invention provides a hybrid vehicle including: distribution means for distributing output torque of an engine between a drive shaft and an input shaft of a generator; a drive motor connected to the drive shaft; generator control means for controlling the rotational speed of the generator; generator torque computation means for computing the output torque of the generator at a rotational speed controlled by the generator control means; and motor control means for producing an output torque from the drive motor based on the output torque computed by the generator torque computation means.

The distribution means may be a differential gear device including a first element which is connected to the generator, a second element which is connected to the engine and a third element which is connected to the drive shaft. The differential gear device, in turn, may be a planetary gear unit in which the first element is a sun gear, the second element is a carrier, and the third element is a ring gear.

The compensatory torque for supplementing torque output by the motor is provided by the engine and is determined based on the generator reaction force torque, generator inertia, gear ratio of the planetary gear unit and counter gear ratio.

The hybrid vehicle of the present invention further includes an engine output control system for controlling the output torque of the engine. This engine control system has a prestored data table (map) of values for engine speed and degree of throttle opening, as exemplified by FIG. 4, and controls the engine by changing the degree of throttle opening responsive to changes in detected engine speed, i.e. by applying the detected values for engine speed to the prestored map.

Because the engine is connected through the distribution means to the generator, engine speed is also controlled by the generator control means. The motor is started/stopped in response to the vehicle speed and the degree of accelerator opening.

The generator control system controls the rotational speed of the generator based on the degree of accelerator opening and the residual storage capacity of the battery. The rotational speed of the generator is computed from the engine speed and the rotational speed of the third element of the planetary gear unit, for example, the rotational speed of the drive (output) shaft. Thus, the rotational speed of the generator increases accordingly as the degree of accelerator opening increases and also increases as the residual storage capacity decreases.

Figure 8:
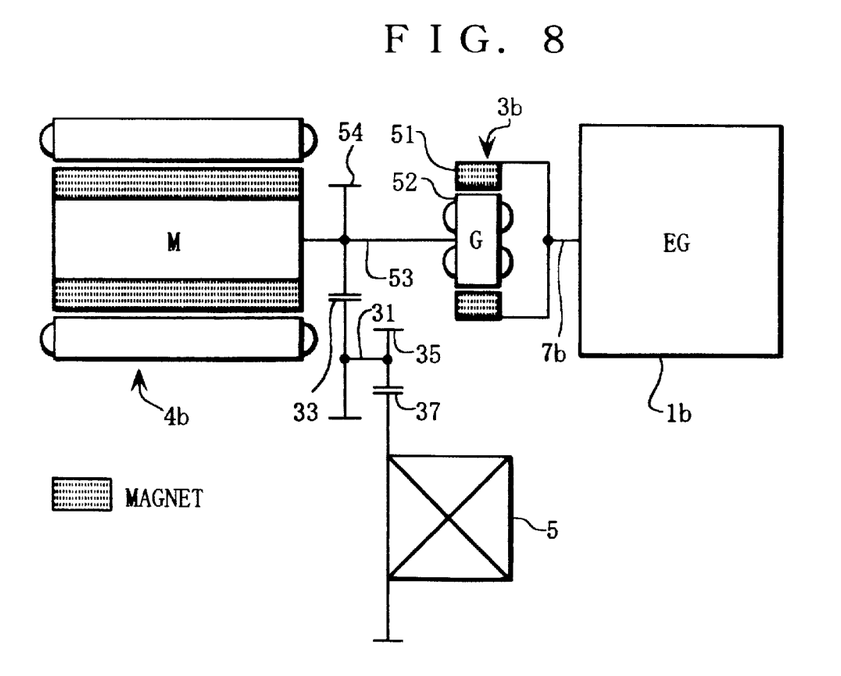
FIG. 8 is a schematic diagram of a second embodiment of a drive train in a hybrid vehicle according to the present invention.

In another embodiment, as shown in FIG. 8, the distribution means is the generator with the generator stator connected to the engine and the generator rotor connected to the drive shaft. The rotational speed of the generator is increased in line with increase in the degree of accelerator opening. The rotational speed of the generator is also increased as the residual storage capacity of the battery decreases.

In the hybrid vehicle according to the present invention, the engine torque is transferred to the drive shaft and to the input shaft of the generator by the distribution means, and the rotational speed of the generator and the engine speed are controlled by the generator control means. The output reaction torque of the generator, operating with its rotational speed controlled by the generator control means, is computed by the generator torque computation means, and then, in response to the computed output reaction torque, the output torque of the motor is regulated by the motor control means.

The hybrid vehicle according to the present invention includes the engine output control means to control the output of the engine so as to, in turn, control the rotational speed of the generator. Furthermore, the engine output control means has a data map for engine speed and the degree of throttle opening for use in controlling the engine, i.e. engine speed, responsive to the degree of throttle opening. On the other hand, the motor control means controls the motor in response to the vehicle speed when moving and when the degree of accelerator opening is increased while the engine is halted.

According to the present invention, in the hybrid vehicle, in which the generator is connected to the engine, a part of the output from the engine goes to the generator and the remaining output from the engine is directly transmitted to the drive (output) shaft, and the total output torque is controlled to be unaffected by changing engine output, resulting in improved driving comfort.

DETAILED DESCRIPTION OF THE PREFERRED EMBODIMENT(S)

Preferred embodiments of a hybrid vehicle according to the present invention will be explained in detail below with reference to FIGS. 1–8.

Figure 1:
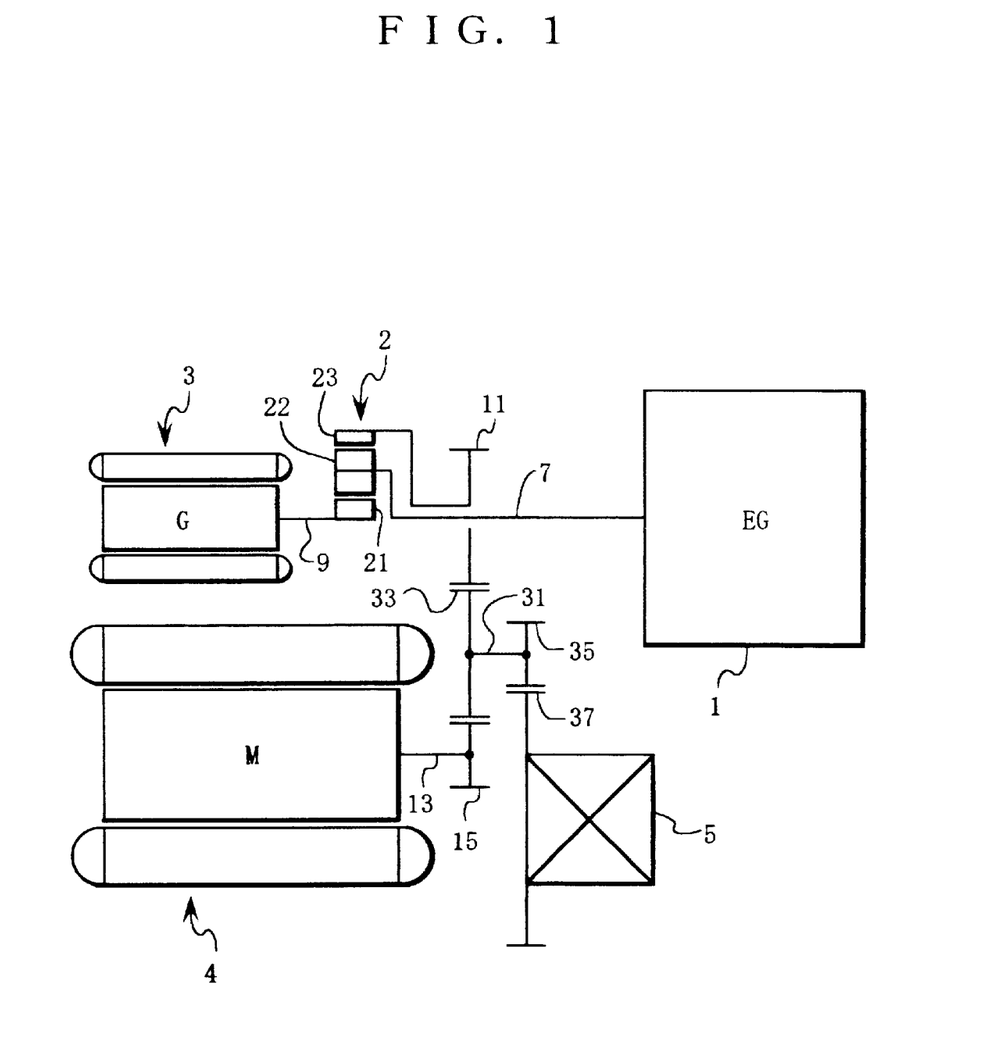
FIG. 1 is a schematic diagram view of a drive train in a hybrid vehicle of the first embodiment according to the present invention.
Figure 2:
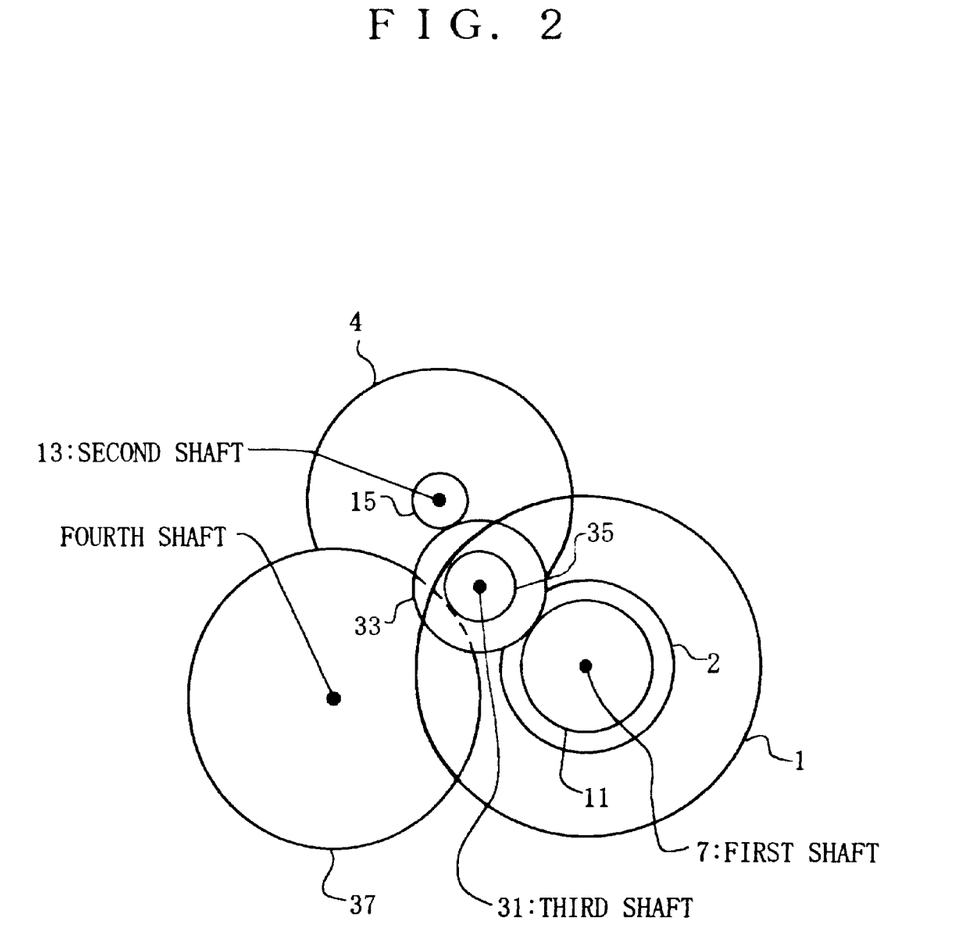
FIG. 2 is a schematic end view showing the relationship of shafts and other drive components in the hybrid vehicle of the first embodiment according to the present invention.

As shown in FIG. 1, the drive train has a four-shaft structure and includes an engine (EG) 1, a planetary gear unit 2, a generator (G) 3, a motor (M) 4 and a differential gear unit 5.

The "first shaft" is the combination of the output shaft 7 of the engine 1 and input shaft 9 of the generator 3 connected through the planetary gear unit 2. The planetary gear unit 2 includes a carrier 22 connected to the output shaft 7 of the engine 1, a sun gear 21 connected to the input shaft 9 of the generator 3 and a ring gear 23 connected to the first counter drive gear 11.

The "second shaft" is output shaft 13 of the motor 4 which carries and drives the second counter drive gear 15.

The "third shaft" is a counter shaft 31 supporting a counter driven gear 33 and a dif-pinion gear 35, with the counter driven gear 33 meshed with the first counter drive gear 11 and the second counter drive gear 15.

A differential gear 5 is driven by a dif-ring gear 37 mounted on the fourth shaft, with the dif-ring gear 37 and dif-pinion gear 35 meshed with one another.

The planetary gear unit 2 functions as a differential gear unit, in which the rotational speed of the sun gear 21 defines the input rotational speed of the carrier 22 in response to the output rotational speed of the ring gear 23. That is, the rotational speed of the sun gear 21 can be controlled by controlling load torque on the generator 3. For example, when the sun gear 21 is freely rotated, the rotation of the carrier 22 causes the sun gear 21 to rotate, but does not cause the ring gear 23 to rotate, whereby no output rotation is produced.

In the planetary gear unit 2, torque input through the carrier 22 is combined with reaction torque of the generator 3 to provide the total output torque. More specifically, the output from the engine 1 is input to the carrier 22, and the reaction torque output from the generator 3 is input to the sun gear 21. The total of these torques is output from the ring gear 23 through the counter gear to the drive wheels at a gear ratio based on engine efficiency. Furthermore, the output of the motor 4 is output through the counter gear to the drive wheels at a sufficient gear ratio for motor efficiency.

Figure 3:
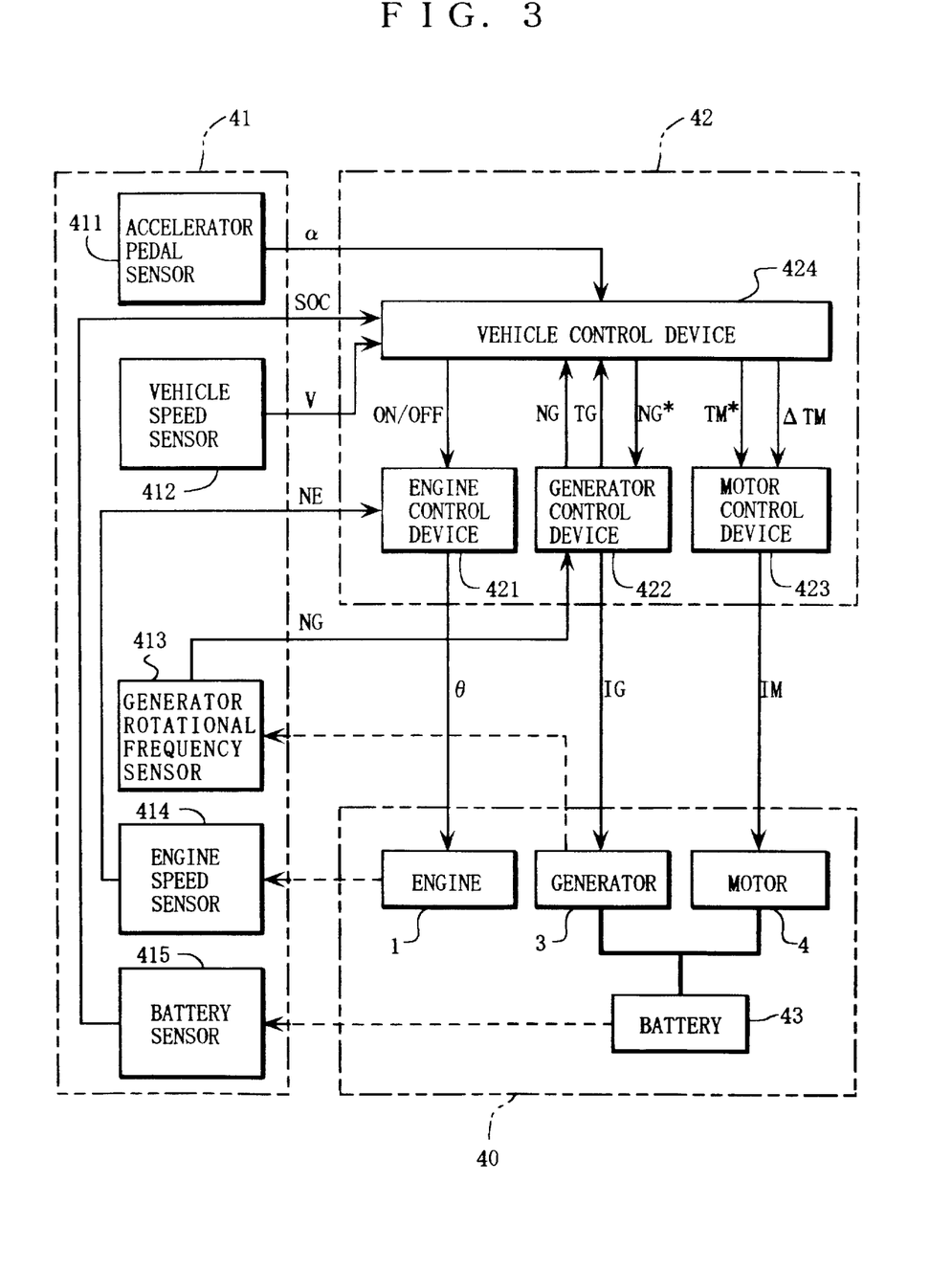
FIG. 3 is a block diagram of a control system of the hybrid vehicle of the first embodiment according to the present invention.

As shown in FIG. 3, the hybrid vehicle includes a driving unit 40, a sensor unit 41 for detecting the conditions of the driving unit 40 and so on, and a control unit 42 for controlling the various components of the driving unit 40.

The driving unit 40 includes the engine 1, the generator 3, the motor 4 and battery 43. The battery 43 supplies electric power to the motor 4 and, in turn, is charged by the regenerative electric power generated by the motor 4 and electric power generated by the generator 3.

The sensor unit 41 includes an accelerator pedal sensor 411 for detecting the degree of accelerator opening which represents the demand of the driver for vehicle driving force, a vehicle speed sensor 412 for detecting vehicle speed V, a generator rotational speed sensor 413 for detecting the rotational speed of the generator 3, an engine speed sensor 414 for detecting the speed of the engine 1, and a battery sensor 415 for detecting residual storage capacity (SOC) of the battery 43.

The control unit 42 includes an engine control system 421 for controlling the engine 4, a generator control system 422 for controlling the generator 3, a motor control system 423 for controlling the motor 4 and a vehicle control system 424 for controlling all of the foregoing by supplying control instructions or control values to the engine control system 421, the generator control system 422 and the motor control system 423.

More specifically, the vehicle control system 424 supplies ON/OFF signals for the engine to the engine control system 421, and supplies the generator control system 422 with a signal for target rotational speed NG* for the generator 3. The target rotational speed NG* is based on the signal for degree of accelerator opening α received from the accelerator pedal sensor 411 and the signal for residual storage capacity (SOC) received from the battery sensor 415. Furthermore, the vehicle control system 424 supplies the motor control system 423 with a signal for torque TM* based on the signal for degree of accelerator opening α received from the accelerator pedal sensor 411 and a signal for the vehicle speed V received from the vehicle speed sensor 412. The vehicle control system 424 also supplies the motor control system 423 with a signal for compensatory torque ΔTM computed therein based on the generator rotational speed NG and generator torque TG, signals for which are received from the generator control system 422.

The engine control system 421 controls the output of the engine 1 by controlling the degree of throttle opening θ based on the signal ON received from the vehicle control system 424 and the feedback signal for engine speed NE received from the engine speed sensor 414.

The generator control system 422 controls the electric current (torque) IG to the generator 3 to produce the target rotational speed NG*.

The motor control system 423 controls the electric current (torque) IM to the motor 4, based on the signals for torque TM* and compensatory torque ΔTM received from the vehicle control system 424.

The following will explain the operation of each control system in this first embodiment.

① Operation of the engine control system 421

Figure 4:
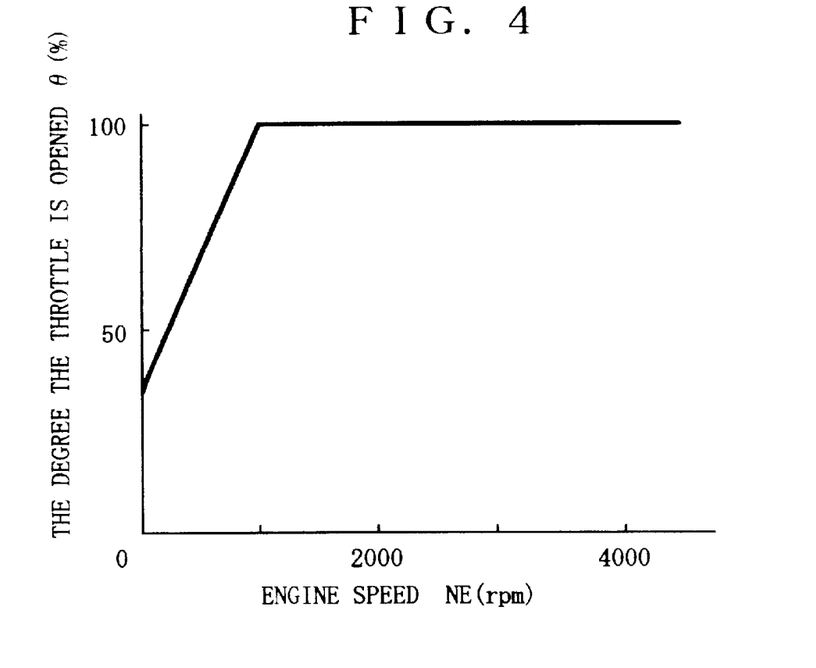
FIG. 4 is a graph of engine speed NE versus degree of throttle opening α in the hybrid vehicle of the first embodiment according to the present invention.
Figure 5:
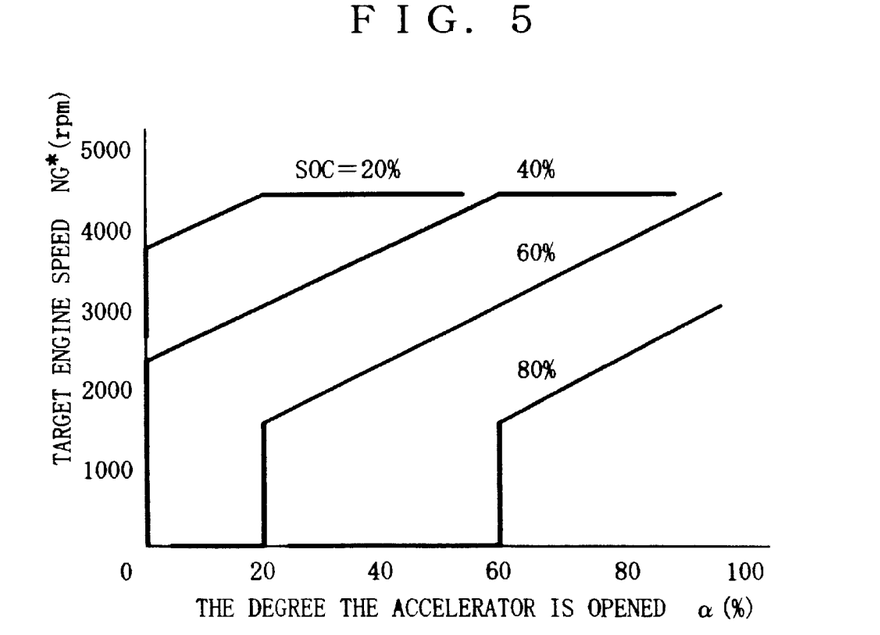
FIG. 5 is a graph of target rotational speed NG* of the engine versus the degree of accelerator opening α and storage residual capacity SOC in the hybrid vehicle of the first embodiment according to the present invention.

FIG. 4 illustrates the relationship between the engine speed NE and the degree of throttle opening α predetermined for optimum fuel efficiency.

The engine control system 421 controls the engine output by controlling the degree of throttle opening α, by applying the value for the detected engine speed derived from the signal received from the vehicle control system 424, to the map of FIG. 4.

② Operation of the generator control system 422

The generator control system 422 controls the current (IG) to the generator 3 in order that the actual rotational speed of the generator matches the target rotational speed NG* determined by the vehicle control system 424.

The vehicle control system 424 defines the target rotational speed NG* based on the signals for the degree of accelerator opening received from the accelerator sensor 411 and for battery residual storage capacity (SOC) received from the battery sensor 415. The relationship between the target rotational speed NG*, the degree the accelerator of opening α, and the residual storage capacity (SOC) is exemplified in FIG. 5. In the above example, as the degree of accelerator opening α increases or as the residual storage capacity (SOC) decreases, the target rotational speed NG* increases.

The generator control system 422 controls the torque of the generator 3 by means of feedback control based on difference between the target rotational speed NG* determined by the vehicle control system 424 and the actual rotational speed NG of the generator 3 as detected by the generator rotational speed sensor 413.

Figure 6:
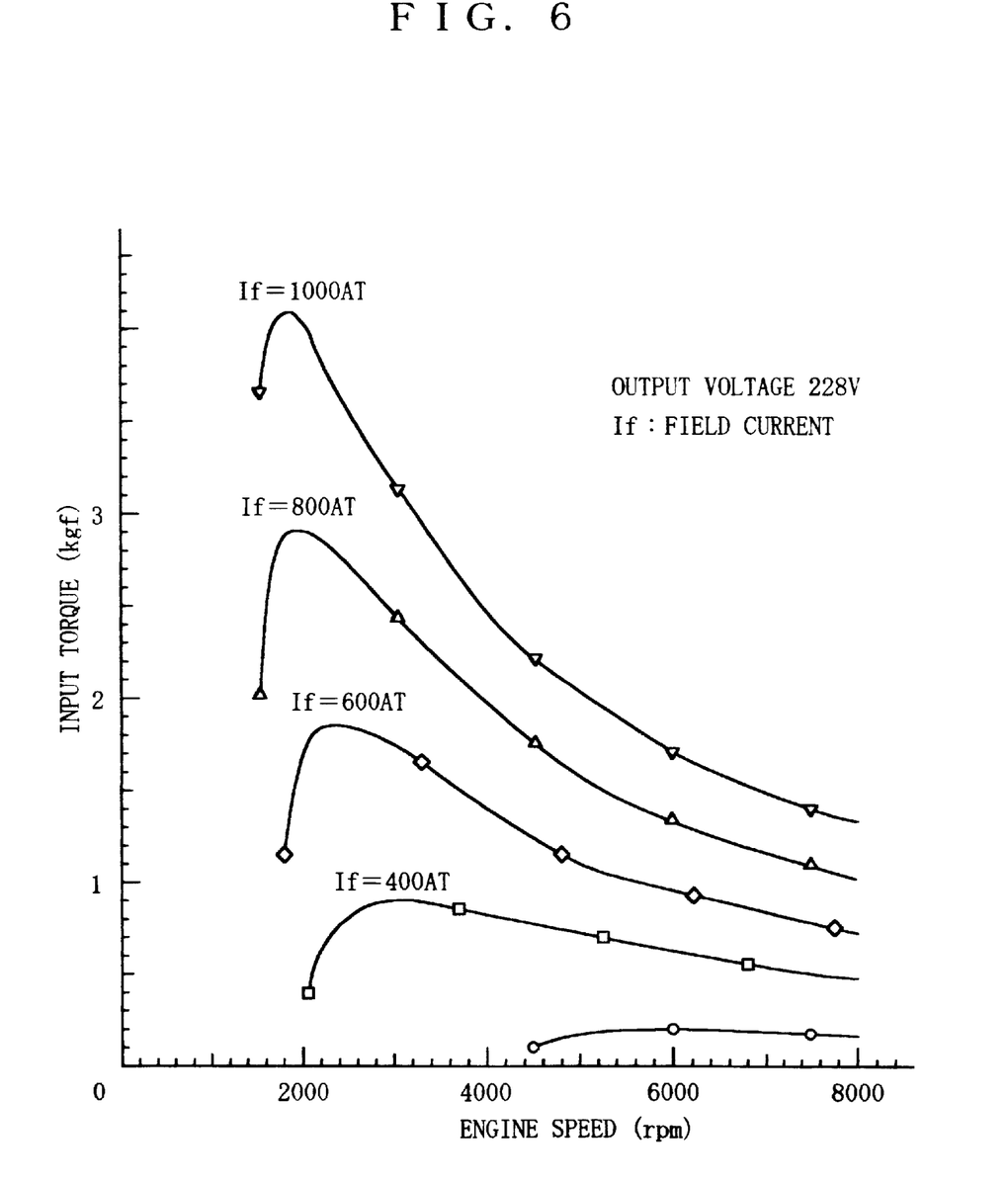
FIG. 6 is a graph of input torque versus engine speed for various generator excitation currents in the hybrid vehicle of the first embodiment according to the present invention.

Furthermore, the generator control system 422 supplies the vehicle control system 424 with the rotational frequency value NG based on the signal received from the generator rotational speed sensor 413 and the generator torque value TG which is determined from the rotational speed NG. When the generator 3 is of the type having a permanent magnet, the torque of the generator 3 is in proportion to the electric current and, therefore, the generator torque TG is computed from the generator electric current. On the other hand, when the generator 3 is of the excitation type, the generator torque TG is determined based on the excitation current If, from a torque—rotational speed map as shown in FIG. 6. Thus, the generator torque TG can be easily and precisely determined for generator 3.

It is also possible that the generator control system 422 can supply the vehicle control system 424 with the generator rotational speed NG and, for example, the excitation current If as a substitute for the generator torque TG, and then the generator torque TG would be computed in the vehicle control system 422.

③ Operation of the motor control system 423

Operation of the motor control system 423 depends on whether or not the engine 1 and the generator 3 are operated (to transfer torque to the drive (output) shaft through the planetary gear unit). When the engine 1 and the generator 3 are not operated, as is usual in operation of an electric vehicle, the vehicle control system 424 computes the torque TM*, defined by the vehicle speed V and the degree of accelerator opening α, and supplies the signal TM* to the motor control system 423. The motor control system 423, in turn, controls the electric current IM of the motor 4 so that the motor torque TM equals TM*.

Figure 7:
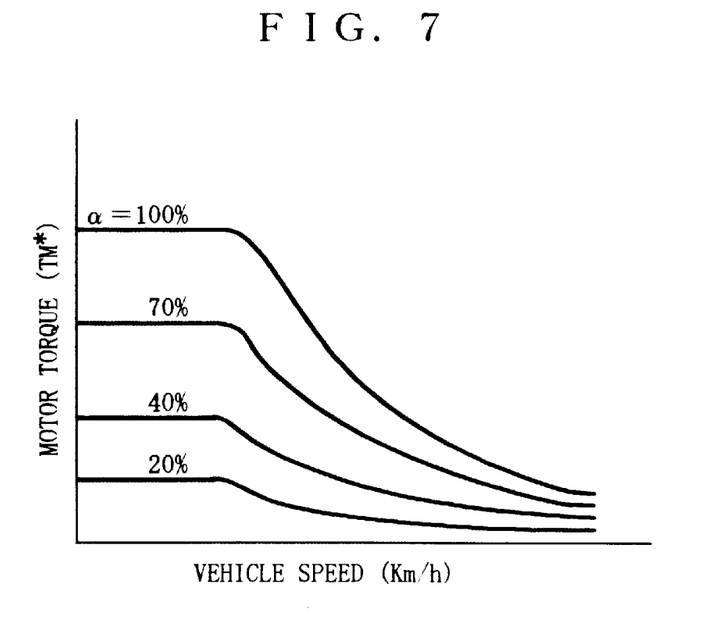
FIG. 7 is a graph of motor torque versus vehicle speed for various degrees of throttle opening in the hybrid vehicle of the first embodiment according to the present invention.

Incidentally, the vehicle control system 424 determines the target motor torque TM* in accordance with the degree of accelerator opening α by reference to a motor torque—vehicle speed map, e.g. as shown in FIG. 7.

On the other hand, when the engine 1 and the generator 3 are operated and their torque is transferred through the planetary gear unit, addition of the motor torque smooths the torque change to avoid any shock or driving discomfort. For this purpose the vehicle control system 424 computes a compensatory (supplemental) torque value ΔTM and supplies a signal for same to the motor control system 423. The compensatory torque ΔTM (supplied by the engine) is computed from the signals for the generator reaction torque TG supplied from the generator control system 422 and the rotational speed change rate for the generator 3.

That is, if generator inertia is defined as InG and generator angular acceleration (the rotational speed change rate) is defined as αG, sun gear torque TS, as seen in the following equation 1, is the sum of the generator reaction torque TG and the torque InG·αG caused by the generator inertia.

$$TS = TG + InG \cdot \alpha G \qquad [\text{EQUATION 1}]$$

Incidentally, the sun gear torque TS equals TG when the rotational speed change rate αG of the generator 3 is extremely small.

On the other hand, if the number of the teeth of the ring gear 23 in the planetary gear unit 2 is twice that of the sun gear 21, the ring gear torque TR would be twice the generator reaction torque TG. Therefore, ΔTM=2·i·TS, when the counter gear ratio is defined as i.

Incidentally, all necessary values used in the aforementioned computations in the vehicle control system 424, for example, the generator reaction torque TG, inertia InG and the rotational speed NG, are easily determined, and difficultly measured values, such as the engine torque, are not required.

Therefore, the vehicle control system 424 supplies the motor control system 423 with a signal for the compensatory (supplemental) torque ΔTM which is calculated based on the sun gear torque.

The motor control system 423 adjusts the target motor torque TM* with the supplemental torque ΔTM signal supplied from the vehicle control system 424. That is, the motor control system 423 controls the electric current IM of the motor 4 to be TM=TM*−ΔTM. Therefore, the actual output torque TM can always maintain the predetermined torque TM* regardless of the torque output by the engine 1 and/or the generator 3.

According to the present invention as described thus far, because the motor torque TM is controlled to compensate for the reaction torque TG of the generator 3 and its rotational speed change rate αG, the total output torque is not changed even as the output of the engine 1 changes and, therefore, the ride is more comfortable.

It is unnecessary to provide a torque sensor for the total output, because the compensatory torque ΔTM is computed using parameters detected for the generator 3.

Furthermore, the control subsystems for the engine 1, the generator 3 and the motor 4 do not exchange signals but, rather, are sequentially operated, with the result that the control subsystems do not interfere with one another.

On advantage of the present invention is that the torque supplied by the motor 4 allows the engine 1 to be able to be driven with a preferred fuel efficiency which is unaffected by the output demanded of the vehicle.

A second embodiment will now be described with reference to FIG. 8 wherein reference numerals the same as used in FIG. 1 designate the same or similar components as those in the first embodiment and the description of such duplicated components will be omitted.

As shown in FIG. 8, in the second embodiment, an output shaft 7b of an engine 1b is connected to a stator 51 (not held by a case) of a generator 3b, and the rotor 52 of the generator 3b is connected to an output shaft 53. A motor 4 is also connected to the output shaft 53. The output shaft 53 carries a counter drive gear 54, and the counter drive gear 54 meshes with the counter driven gear 33 carried by the counter shaft 31.

In the first embodiment, since the engine 1 and the generator 3 are connected through the planetary gear unit 2 to the output shaft, the torque TR of the ring gear 23 connected to the output shaft is twice the torque of the sun gear unit 21. On the other hand, in the second embodiment, because the generator shaft and motor shaft are directly connected (without an intervening planetary gear unit), the motor torque and reaction torque of the generator are determined independent of gear ratio and the compensatory torque ΔTM for the motor accordingly becomes: ΔTM=TG+ InG·αG.

It is to be understood that the present invention is not intended to be limited to the above-described embodiments, and various modifications are possible. For example, in the foregoing embodiments, the vehicle control system 424 computes the compensatory torque ΔTM, however, in the alternative, the motor control system 423 may compute the compensatory torque ΔTM based on signals for the generator torque TG and the rotational speed NG received from the generator control system 422.

The generator rotational speed sensor 413 detects the generator rotational speed NG in the foregoing embodiments, but by inputting the engine speed NE from the engine speed sensor 414, the generator rotational speed NG may be computed from the generator rotational speed (the sun gear speed) defined as NG, the engine speed (the carrier speed) defined as NE, and the output shaft rotational speed (the ring gear speed) defined as NR. If the number of teeth on the ring gear 23 is twice the number of teeth on the sun gear, the following equation 2 applies:

$$NG = 3 \cdot NE - 2 \cdot NR \qquad [\text{EQUATION 2}]$$

As seen from the above equation 2, the engine speed NE and the generator rotational speed NG can be computed from each other. Therefore, instead of detecting the generator rotational speed NG with the generator rotational speed sensor 413, the engine speed NE detected with the engine speed sensor 414 is used to compute the rotational speed NG and the rotational speed NG is used to compute the generator reaction torque TG. Therefore, the generator rotational speed sensor is not necessary.

Furthermore, the first embodiment has been described as having the engine and the generator connected through a planetary gear unit to the output shaft; however, in the present invention, the engine and the generator may be connected through other types of differential gearing such as a bevel gear connecting to the output shaft.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hybrid vehicle comprising:
   a generator;
   a drive shaft for transmitting torque to drive wheels of the vehicle;
   a drive motor for outputting motor torque to the drive wheels through said drive shaft;
   an engine;
   engine torque distribution means for selectively distributing engine torque output from said engine to said generator and to said drive shaft;
   generator control means for controlling rotational speed of said generator;
   generator torque computation means for computing output torque of the generator; and
   motor control means for controlling said motor torque responsive to the computed output torque of the generator.

2. A hybrid vehicle according to claim 1, wherein said distribution means is a differential gear device including a first element which is connected for rotation with said generator, a second element which is connected for rotation with said engine and a third element which is connected for rotation with said drive shaft.

3. A hybrid vehicle according to claim 1, further comprising engine output torque control means for controlling engine torque output by the engine.

4. A hybrid vehicle according to claim 2, wherein the differential gear device is a planetary gear unit.

5. A hybrid vehicle according to claim 4, wherein said first element is a sun gear, said second element is a carrier, and said third element is a ring gear.

6. A hybrid vehicle according to claim 3, wherein said engine output torque control means includes a data map correlating values for engine speed and values for degree of throttle opening, and wherein said engine control system controls the engine by deriving a value for degree of throttle opening by applying a value for engine speed to the data map.

7. A hybrid vehicle according to claim 1, further comprising a battery, means for determining degree of accelerator opening and means for determining residual storage capacity of the battery and wherein said generator control means controls the rotational speed of the generator responsive to the determined degree of accelerator opening and the determined residual storage capacity.

8. A hybrid vehicle according to claim 4, further comprising a battery, means for determining degree of accelerator opening and means for determining residual storage capacity of the battery and wherein said generator control system controls the rotational speed of the generator responsive to the determined degree of accelerator opening and the determined residual storage capacity.

9. A hybrid vehicle according to claim 8, wherein a target rotational speed for the generator is computed from values for engine speed and for rotational speed of the third element of said planetary gear unit.

10. A hybrid vehicle according to claim 1, wherein said engine is connected through said distribution means to said generator and wherein the speed of said engine is controlled by the generator control means.

11. A hybrid vehicle according to claim 1, wherein said motor is controlled responsive to vehicle speed and degree of accelerator opening when said engine is not running.

12. A hybrid vehicle according to claim 4, further comprising counter gears coupling said drive shaft to said drive wheels and wherein the torque transmitted through said drive shaft is the sum of said motor torque and a compensatory torque which is defined by generator torque, generator inertia, the gear ratio of the planetary gear unit and the gear ratio of said counter gears.

13. A hybrid vehicle according to claim 1, wherein said engine torque distribution means is a generator including a stator connected to the engine and a rotor connected to the drive shaft.

14. A hybrid vehicle according to claim 13, further comprising engine output torque control means for controlling engine torque output by the engine.

15. A hybrid vehicle according to claim 7, wherein the rotational speed of the generator is increased as the determined degree of accelerator opening increases.

16. A hybrid vehicle according to claim 7, wherein the rotational speed of the generator is increased as the determined residual storage capacity decreases.

17. A hybrid vehicle according to claim 1 wherein said generator and said drive motor are arranged in parallel relative to said drive shaft.

* * * * *